(12) United States Patent
Wang et al.

(10) Patent No.: US 8,366,026 B2
(45) Date of Patent: Feb. 5, 2013

(54) GAS VALVE WITH HIGH SPEED OPENING AND HIGH SPEED GAS FLOW CAPABILITY

(75) Inventors: Xiaodong Wang, Markham (CA); Colin Williams, Bolton (CA)

(73) Assignee: Microsys Technologies, Inc., Mississauga, Ontario (CA)

( * ) Notice: Subject to any disclaimer, the term of this patent is extended or adjusted under 35 U.S.C. 154(b) by 192 days.

(21) Appl. No.: 12/717,657

(22) Filed: Mar. 4, 2010

(65) Prior Publication Data

US 2010/0187455 A1 Jul. 29, 2010

Related U.S. Application Data

(63) Continuation of application No. PCT/CA2008/001556, filed on Sep. 4, 2008.

(60) Provisional application No. 60/935,965, filed on Sep. 7, 2007.

(51) Int. Cl.
*F16K 31/06* (2006.01)

(52) U.S. Cl. .................. 239/585.3; 251/14; 251/129.03; 251/129.16; 335/224

(58) Field of Classification Search ............ 251/129.16, 251/14, 48–55, 129.01, 129.03, 129.15; 239/585.3; 335/224–226

See application file for complete search history.

(56) References Cited

U.S. PATENT DOCUMENTS

| | | | |
|---|---|---|---|
| 3,368,788 A | 2/1968 | Padula | |
| 3,523,677 A * | 8/1970 | North | 251/129.05 |
| 3,785,612 A | 1/1974 | Schertler | |
| 4,344,449 A * | 8/1982 | Meyer | 137/1 |
| 4,494,043 A * | 1/1985 | Stallings et al. | 315/111.41 |
| 4,635,855 A * | 1/1987 | Kuyel et al. | 239/551 |
| 4,862,043 A | 8/1989 | Zieve | |
| 4,951,697 A | 8/1990 | Fritts | |
| 5,081,862 A | 1/1992 | Merten, Jr. | |
| 5,085,402 A | 2/1992 | O'Dell | |
| 5,259,417 A | 11/1993 | Merten, Jr. | |
| 5,355,740 A | 10/1994 | Beaudet et al. | |
| 5,597,179 A | 1/1997 | Kornhauser | |
| 5,621,963 A | 4/1997 | Givler | |
| 5,832,883 A * | 11/1998 | Bae | 123/90.11 |
| 5,850,085 A | 12/1998 | Rosenbluth | |
| 6,076,490 A * | 6/2000 | Esch et al. | 123/90.11 |
| 6,474,142 B2 | 11/2002 | Specht et al. | |
| 6,499,447 B2 * | 12/2002 | Cosfeld et al. | 123/90.11 |

(Continued)

FOREIGN PATENT DOCUMENTS

| | | |
|---|---|---|
| GB | 2313876 | 12/1997 |
| JP | 58191380 A | 11/1983 |
| JP | 2004155288 A | 6/2004 |
| WO | 99/14077 | 3/1999 |
| WO | 02/061385 A1 | 8/2002 |

*Primary Examiner* — John Bastianelli
(74) *Attorney, Agent, or Firm* — Simpson & Simpson, PLLC

(57) ABSTRACT

A high speed gas valve apparatus including a reservoir for holding a gas having a charge port for filling the reservoir with the gas and an outlet for releasing the gas from the reservoir, a rod slidingly housed in the valve apparatus, the rod including a sealing means operatively arranged to engage with the outlet of the valve chamber for sealing the reservoir when the valve is in a closed position, a pneumatic actuator, wherein a piston of the pneumatic actuator is coupled to the rod, an electro-magnetic actuator coupled to the rod, and wherein the gas is released from the reservoir via the outlet when the apparatus is in an open position, and the valve transitions from the closed position to the open position by activating the pneumatic and electro-magnetic actuators to move the rod away from the outlet.

13 Claims, 6 Drawing Sheets

U.S. PATENT DOCUMENTS

| | | |
|---|---|---|
| 6,550,335 B2 | 4/2003 | Weber et al. |
| 6,572,074 B2 * | 6/2003 | Yang et al. ................ 251/54 |
| 6,817,592 B2 * | 11/2004 | Mianzo et al. ............. 251/54 |
| 6,896,236 B2 * | 5/2005 | Wang et al. ................ 251/30.01 |
| 6,997,433 B2 * | 2/2006 | Koneda et al. ............. 251/129.2 |
| 2004/0061318 A1 | 4/2004 | Ord |

* cited by examiner

GAS VALVE WITH HIGH SPEED OPENING AND HIGH SPEED GAS FLOW CAPABILITY

CROSS-REFERENCE TO RELATED APPLICATIONS

This application is filed under 35 U.S.C. §120 and §365(c) as a continuation of International Patent Application PCT/CA2008/001556, filed Sep. 4, 2008, which application claims priority from U.S. Provisional Patent Application No. 60/935,965, filed Sep. 7, 2007, which applications are incorporated herein by reference in their entireties.

TECHNICAL FIELD

The invention relates to gas valves with high speed opening and high speed gas flow capability.

BACKGROUND ART

Gas valves with high speed opening and high speed gas flow capability are required for various uses, for example in cold gas airbag inflation test systems for testing automobile airbags that protect occupants of the automobile in the event of a collision. Specifically, airbag deployment systems basically include an airbag and an inflator. The inflator generates and releases the gas necessary to inflate the airbag. During a collision in an automobile, the inflator is triggered by the destruction of a rupture disc, which releases the gas to fill the airbag in a mere fraction of a second.

Even a small change in the orientation of a vehicle's dash board could have a significant effect on the deployment of an airbag since the deployment occurs so quickly. As a result, many tests must be performed throughout the design or re-design process of an automobile to ensure that the deployment of the airbags meet all regulations or requirements. The rupture discs are permanently destroyed in automobile airbag systems so the airbags must be completely replaced after use. It is therefore not feasible to use actual airbag systems to run large numbers of tests while designing a vehicle.

Instead, a separate, re-usable valve apparatus is desired to simulate the destruction of the rupture disc and subsequent inflation of the airbag. Such a valve must perform consistently and accurately so that it does not skew data being collected or introduce error into the tests. These valves must also deploy extremely quickly to properly simulate actual airbag deployment. A typical simulation gas valve inflator, for example, may need to consistently open a one inch diameter valve in 2 ms. At the present time, suitable gas valves for this purpose do not appear to be commercially available which can properly simulate actual airbag deployment in a nondestructive manner.

For example, U.S. Pat. No. 4,635,855 (Kuyel et al.) teaches a method and apparatus for rapidly controlling a flow of gas which utilizes a conductive disc to seal an orifice of a plenum holding the gas, and an electrode located proximate to the plate. By applying a current through the electrode, an eddy current is induced in the disc, which creates a repulsion force that repels the disc away from the electrode for opening the orifice. However, to open the orifice, the repulsion force must overcome a force due to pressure of the gas stored in the plenum, and therefore, is too slow and inconsistent to be used in an airbag deployment simulation. Furthermore, the apparatus taught in this reference would open even slower, or perhaps not at all, when used with gases having significantly high pressures, as the repulsion force would have to be incredibly high to overcome the force due to pressure.

Similarly, Japanese Patent Publication No. JP58191380 (Kazuo) teaches a gas valve which utilizes induced eddy currents in a plate coupled to a rod to open or close the valve by varying the current passing through permanent magnets located proximate to the plate. Like the '855 patent to Kuyel et al., the system taught in this reference must overcome a force on the plate due to a pressure of the gas, and therefore, is too slow and inconsistent to be used to test airbag deployment. Also like the Kuyel et al. apparatus, the system taught in this reference would open even slower, or perhaps not at all, when used with gases having significantly high pressures, as the repulsion force would have to be incredibly high to overcome the force due to pressure.

It is therefore an object of the invention to provide a gas valve which is capable of high speed opening and high speed gas flow and is also suitable for use in a cold gas airbag test system.

DISCLOSURE OF INVENTION

The present invention broadly comprises a high speed gas valve apparatus including a reservoir for holding a gas having a charge port for filling the reservoir with the gas and an outlet for releasing the gas from the reservoir, a rod slidingly housed in the valve apparatus, the rod including a sealing means operatively arranged to engage with the outlet of the valve chamber for sealing the reservoir when the valve is in a closed position, a pneumatic actuator, wherein a piston of the pneumatic actuator is coupled to the rod, an electro-magnetic actuator coupled to the rod, and wherein the gas is released from the reservoir via the outlet when the apparatus is in an open position, and the valve transitions from the closed position to the open position by activating the pneumatic and electro-magnetic actuators to move the rod away from the outlet.

In one embodiment, the valve apparatus further includes a first chamber and a second chamber located on opposite sides of the piston of the pneumatic actuator, wherein the gas in the reservoir has a first pressure that exerts a first force on the rod in a first direction for maintaining the valve in the closed position by forcing the sealing means of the rod to remain engaged with the outlet, wherein a second pressure in the first chamber exerts a second force on the piston in the first direction for forcing the sealing means of the rod to engage with the outlet, wherein a third pressure in the second chamber exerts a third force on the piston in a second direction, wherein the second direction is opposite from the first direction, and wherein subsequent to an activation of the pneumatic actuator, but preceding an activation of the electro-magnetic actuator, a sum of the first and second forces is greater than the third force.

In a further embodiment, the third force is slightly less than the sum of the first and second forces for substantially reducing a net force required by the electro-magnetic actuator to transition the valve from the closed position into the open position.

In another embodiment, the electro-magnetic actuator comprises an electronic coil and an electrically conductive plate, wherein the plate is fixedly secured to the rod and located proximate to the coil when the valve is in the closed position, wherein the coil is electronically connected to a capacitor, wherein the electro-magnetic actuator is activated by discharging a current from the capacitor through the coil for creating a first magnetic field, wherein the first magnetic field induces a second magnetic field in the plate, and the second magnetic field is oppositely polarized with respect to the first magnetic field, wherein a repulsion force is created due to the first and second magnetic fields being oppositely polarized, and the repulsion force repels the plate away from the coil for transitioning the valve from the closed position to the open position by moving the rod away from the outlet.

The current invention also broadly comprises a method of operating a gas valve comprising the steps of: (a) pressurizing a first chamber in a pneumatic actuator, wherein a first pressure in the first chamber exerts a first force in a first direction on a piston of the pneumatic actuator, wherein the piston is coupled to a rod, for entering the valve into a closed position by forcing the rod to engage with an outlet of a reservoir of the gas valve; (b) pressurizing a reservoir of the gas valve with a gas having a second pressure; (c) depressurizing the first chamber in the pneumatic actuator for reducing the first pressure and the first force, wherein the gas in the reservoir exerts a second force due to the second pressure in the first direction on the piston for maintaining the valve in the closed position by forcing the rod to stay engaged with the outlet; (d) pressurizing a second chamber in the pneumatic actuator located on an opposite side of the piston from the first chamber, wherein a third pressure in the second chamber exerts a third force on the piston in a second direction opposite from the first direction of the first and second forces, wherein the piston transfers the third force to the rod, and wherein a sum of the first and second forces is larger than the third force; and, (e) activating an electro-magnetic actuator coupled to the rod for releasing the gas from the reservoir by transitioning the valve from the closed position to an open position by moving the rod away from the outlet.

In one embodiment, subsequent to step (d), but prior to step (e), the third force is slightly less than the sum of the first and second forces for substantially reducing a net force required by the electro-magnetic actuator to transitioning the valve into the open position. In another embodiment, activating the electro-magnetic actuator in step (e) further comprises discharging a current through an electronic coil for creating a first magnetic field, wherein the electronic coil is located proximate to a plate which is fixedly secured to the rod, wherein the first magnetic field induces a second magnetic field in the plate, and the second magnetic field is polarized oppositely with respect to the first magnetic field, wherein a repulsion force is created due to the first and second magnetic fields being oppositely polarized, and the repulsion force repels the plate from the coil for transitioning the valve from the closed position to the open position by forcing the rod away from the outlet.

These and other objects and advantages of the present invention will be readily appreciable from the following description of preferred embodiments of the invention and from the accompanying drawings and claims.

BRIEF DESCRIPTION OF DRAWINGS

The nature and mode of operation of the present invention will now be more fully described in the following detailed description of the invention taken with the accompanying drawing figures, in which.

BEST MODE FOR CARRYING OUT THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
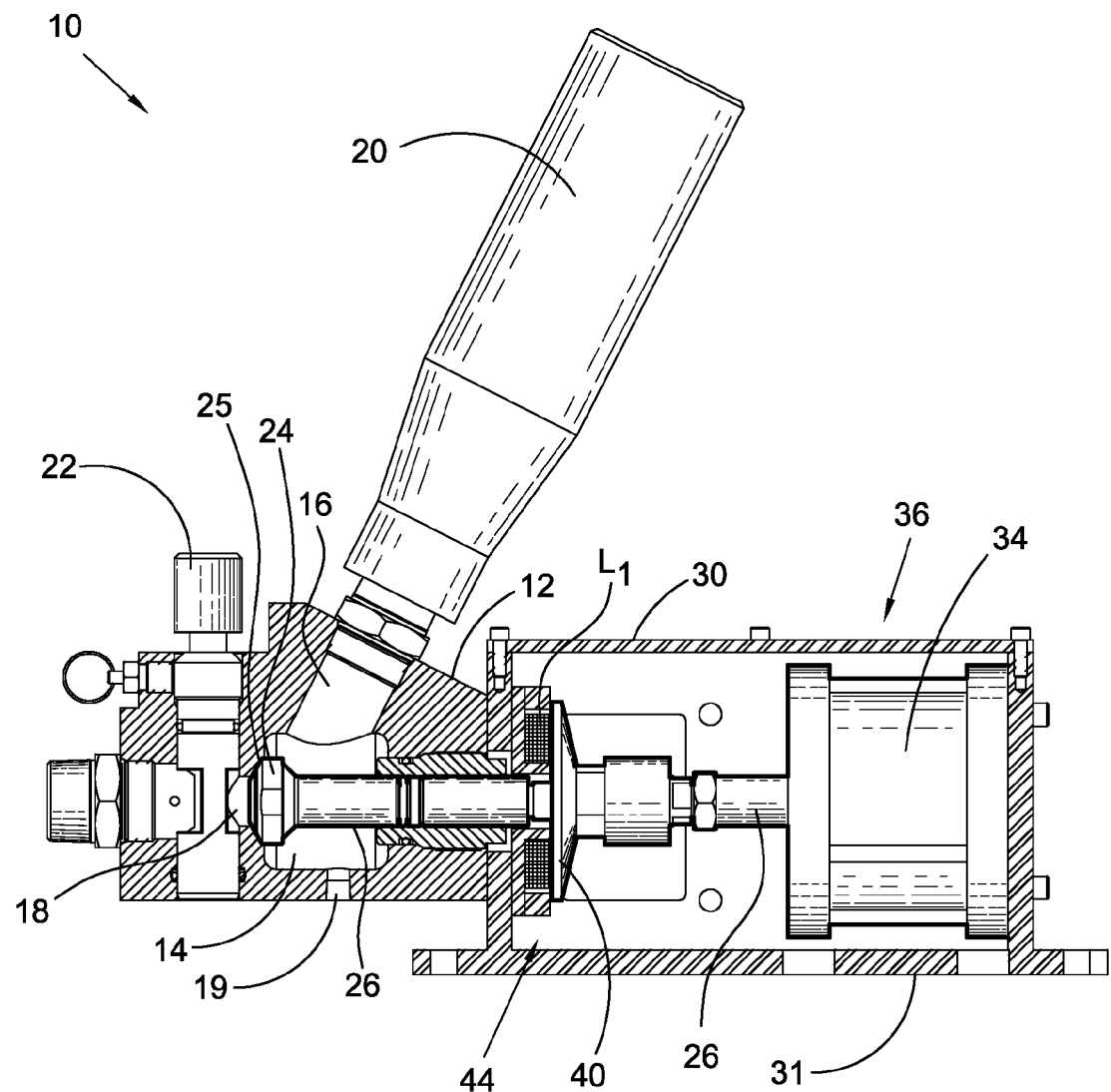
FIG. 1 is a partial cross-sectional side view of a gas valve according to the current invention.

Referring now to the Figures, FIG. 1 illustrates high speed gas valve 10, according to the current invention. Gas valve 10 includes valve body 12 that defines valve chamber or reservoir 14, which includes auxiliary inlet 16, outlet 18, and valve charge port 19. Auxiliary charge vessel 20 is detachably securable to inlet 16 and orifice bar 22 is detachably securable proximate to outlet 18.

Since reservoir 14 is a fixed volume, auxiliary charge vessel 20 is attached to reservoir 14 so that the volume of gas that valve 10 can hold is variably changeable. For example, if the reservoir has a volume of 1 L, auxiliary vessels of 0.5 L, 0.75 L, or 1 L could be attached via inlet 16 to increase the volume of gas in valve apparatus 10 to 1.5 L, 1.75 L, and 2 L, respectively. Orifice bar 22 includes a hole that is aligned with outlet 18 for determining the flow characteristics of gas released from chamber 14 via outlet 18. For example, it may be desirable to increase or decrease the exit velocity or mass flow rate of the gas from the outlet by varying the size of the hole in the orifice bar.

Valve sealing member 24 which includes valve sealing ring 25 is included on one end of rod 26. The rod is slidingly movable within the valve apparatus for selectably sealing and opening outlet 18. That is, valve closure member 24, which resembles a large bulb on the end of rod 26, is pressed into outlet 18 to create an airtight seal with the aid of sealing ring 25. Thus, the sealing member alone or together with the sealing ring comprises a sealing means for the valve. Sealing ring 25 is preferably a flexible and resilient o-ring fabricated from any number of polymers or other suitable materials. A second end of rod 26, opposite from valve sealing member 24, extends into housing 30, which is secured to valve body 12. Housing 30 is preferably fixed to an immobile object via mount 31, which may use bolts (not shown) or some other means known in the art to secure valve 10 in place. The second end of rod 26 is affixed to piston 32, which is slidingly mounted within cylinder 34, which in turn is mounted in housing 30. Piston 32 and cylinder 34 are components of pneumatic actuator 36, which may be any pneumatic actuator known in the art, including those that are commonly available commercially, but which preferably takes the general form shown in the Figures and described herein.

Plate 40 is mounted to an intermediate portion of rod 26 between sealing member 24 and pneumatic actuator 36. The disc is located adjacent to electrical coil $L_1$ when the valve is in a closed position. By closed position we mean that sealing means 24 on rod 26 is engaged in a sealed relation with outlet 18 so that no gas stored in reservoir 14 can escape the reservoir through the outlet. The coil is fixedly mounted to housing 30 so that it is immovable with respect to valve 10. Plate 40 and coil $L_1$ are components of electro-magnetic actuator 44.

Figure 2A:
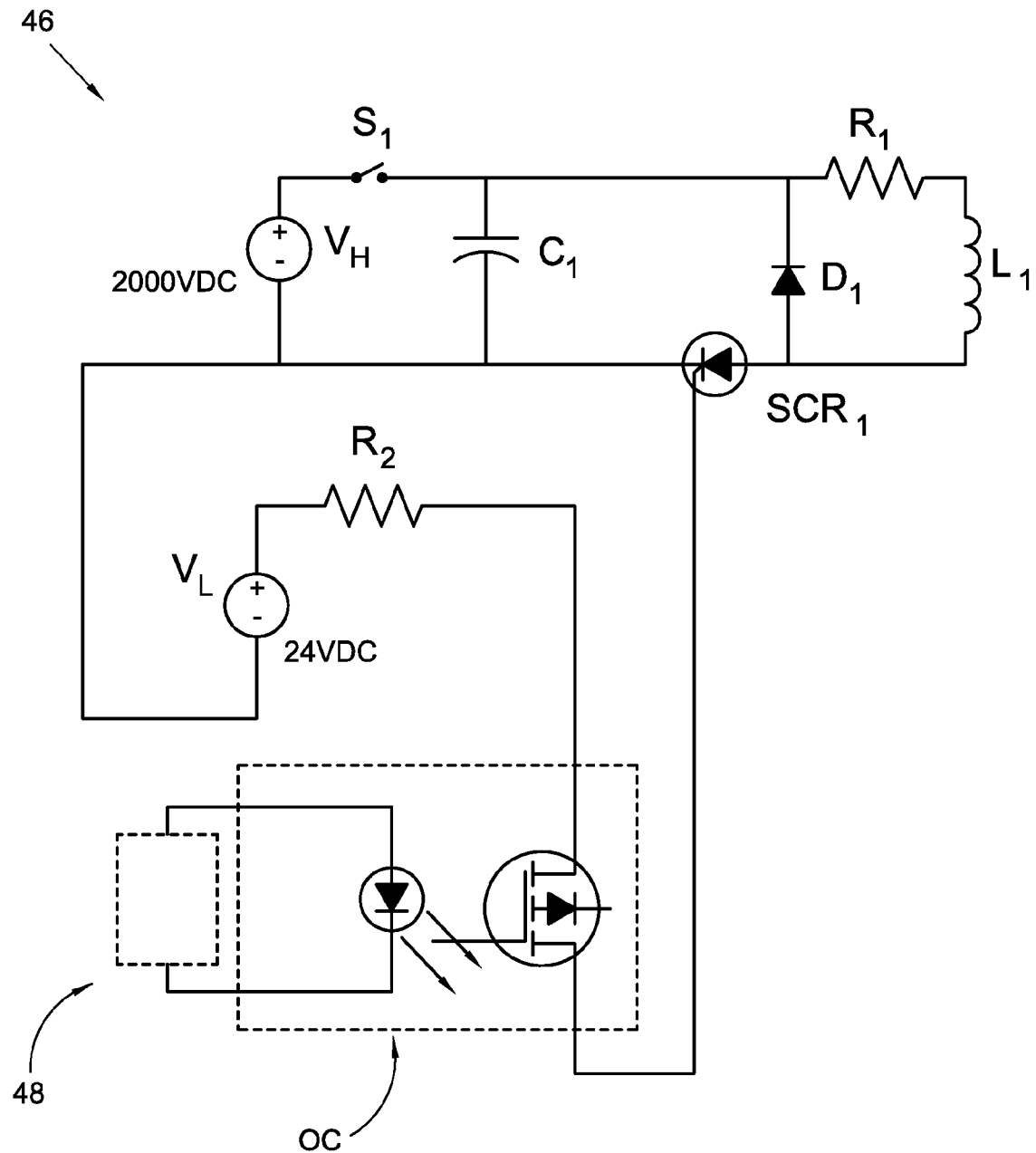
FIG. 2*a* is a schematic of a circuit for operating the electro-magnetic actuator of the gas valve shown in FIG. 1.

A preferred embodiment of main circuit 46 for electro-magnetic actuator 44 is shown schematically in FIG. 2A. The circuit includes coil $L_1$, high voltage power source $V_H$, capacitor $C_1$, resistors $R_1$ and $R_2$, diode $D_1$, silicon-controlled rectifier $SCR_1$, switch $S_1$, optocoupler OC, control circuit 48 and low voltage source $V_L$. High voltage supply $V_H$ is used to charge capacitor $C_1$, which stores the energy dissipated by the high voltage power source. Silicon-controlled rectifier $SCR_1$ acts as a high-speed switch for delivering the energy from capacitor $C_1$ to coil $L_1$. Diode $D_1$ is connected across coil $L_1$ to protect the other components of the circuit from the back EMF generated by the rapid collapsing magnetic field in the coil. Optocoupler OC electronically isolates control circuit 48 and sends signals in the form of light or optics from the control circuit to operate main circuit 46. Control circuit 48 may send signals via the optocoupler to open and close switch $S_1$ or turn the SCR on and off, for example. Low voltage power supply $V_L$ provides a low voltage to the gate of the SCR to enable the SCR to operate. The resistance of resistor $R_2$ is chosen to regulate the voltage that is applied to gate G, as is well known to those having ordinary skill in the art of circuit design.

Figures 2B, 2C:
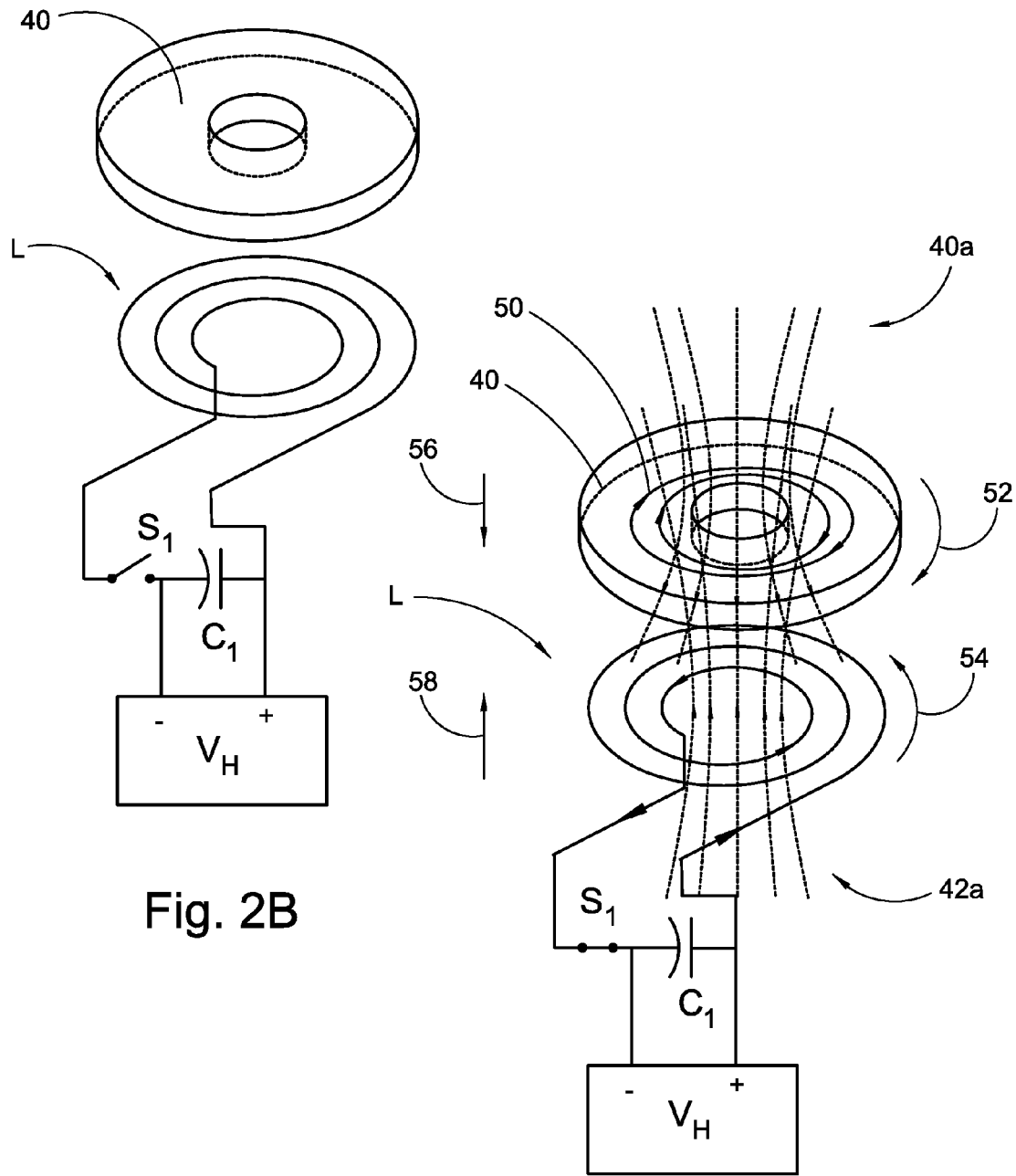
FIG. 2*b* is a relevant portion of the schematic shown in FIG. 2*a* with the switch open.
FIG. 2*c* is a relevant portion of the schematic shown in FIG. 2*a* with the switch closed; and, FIGS. 3-8 are cross-sectional views of the gas valve shown in FIG. 1 incrementally illustrating operation of the gas valve.

FIGS. 2B and 2C show a schematic of the relevant portion of circuit 46 and plate 40 when switch $S_1$ is opened and closed, respectively. When switch $S_1$ is open no current passes through the coil. When switch $S_1$ is closed, as in FIG. 2C, large currents (several hundred amperes, for example) are generated because of the high voltage and capacitance, and extremely short discharge time of the capacitor, causing the coil to produce a powerful increasing magnetic field 42a, which passes through plate 40. While passing through the plate, magnetic field 42a induces eddy currents 50 in the direction indicated by arrow 52, which is opposite to the direction of current through the coil, as indicated by arrow 54. The induced current in plate 40 generates magnetic field 40a oppositely polarized with respect to magnetic field 42a, as fields 40a and 42a act generally in the direction of arrows 58 and 56, respectively. The two oppositely polarized magnetic fields generate a large repulsive force between the coil and the plate. The coil cannot move, as it is fixedly secured to housing 30 which is immovably anchored by valve mount 31. Consequently, the repulsive force rapidly repels plate 40 from coil $L_1$. Since the plate is fixedly secured to the rod, the plate and the rod are forced in direction 58 away from outlet 18, to open outlet of valve 10.

The following describes the parameters of a preferred embodiment of circuit 46, as shown in FIG. 2, but it should be understood that the circuit could have other parameters readily recognizable by one skilled in the art. In order to maximize the energy transfer between the coil and the plate, the values of the capacitance, inductance and resistance should be chosen such that they create a critically damped circuit. Further, the below embodiment is designed to produce approximately a 600 lb force for 200 µs between plate 40 and coil $L_1$, with the total energy being dissipated in about 500 µs. In this embodiment, coil $L_1$ has an inductance of approximately 2 mH, high voltage power source $V_H$ is a 2000 VDC, 60 mA power supply, capacitor C has a capacitance of 150 µF, resistor $R_1$ is achieved by approximately 1Ω of inherent wire resistance so that an actual resistor is not used, and low voltage source $V_L$ is a 24 VDC power supply. The overall length of the coil should be kept to a minimum and the plate should be kept as close to the coil as possible. In order to reduce the length of the wire used to make coil $L_1$ and to maintain the physical soundness of the coil, ribbon wire is preferably used instead of traditional magnetic wire. In the preferred embodiment, plate 40 is made of aluminum because it is lightweight and produces a sufficient magnetic field. Steel plates tend to be heavy and may occasionally become magnetically attracted to the coil. In this preferred embodiment, the coil and plate are pressed together, separated by only a thin sheet of plastic. It should be appreciated that the circuit elements and their associated values recited above are illustrative only, and that circuits having elements with different values can easily be configured by one having ordinary skill in the art of circuit design.

Figure 3:
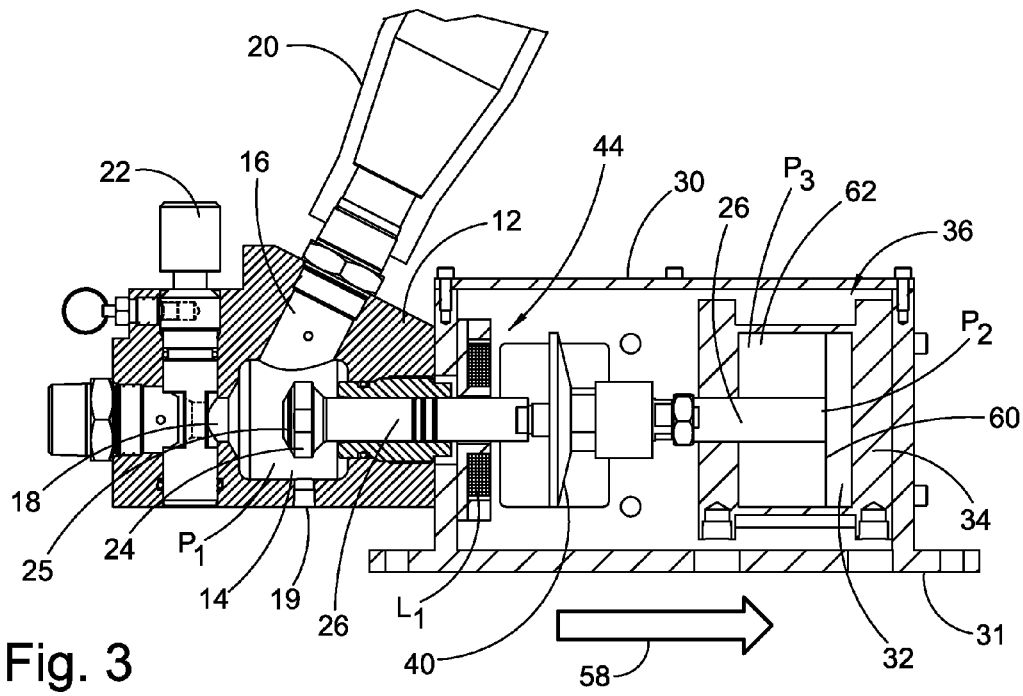

The valve is shown in an initial, open state in a cross-sectional view in FIG. 3. By open we mean that sealing member 24 on rod 26 is not in a sealed relation with outlet 18 so that gas can freely escape the outlet from reservoir 14. Pneumatic actuator 36 includes chambers 60 and 62 on opposite sides of piston 32 in cylinder 34. Chamber 60 cannot be seen in FIG. 3 as the piston is pushed to the far right side of the cylinder, leaving no room for chamber 60. Pressures $P_1$, $P_2$, and $P_3$ represent the pressures in chambers 14, 60, and 62, respectively. In the initial state as shown in this Figure, all of the pressures are substantially equal to the atmospheric pressure, and the system is therefore balanced and in equilibrium. By atmospheric pressure we mean the pressure of the room or area in which valve 10 is housed. It should be appreciated that when pressures P1, P2, and P3 are discussed in relative terms, or as gauge pressures, atmospheric pressure is assumed to be zero or no pressure. Therefore, a chamber at atmospheric pressure is assumed to exert no forces on the chamber or objects in the chamber, such as the rod.

Figure 4:
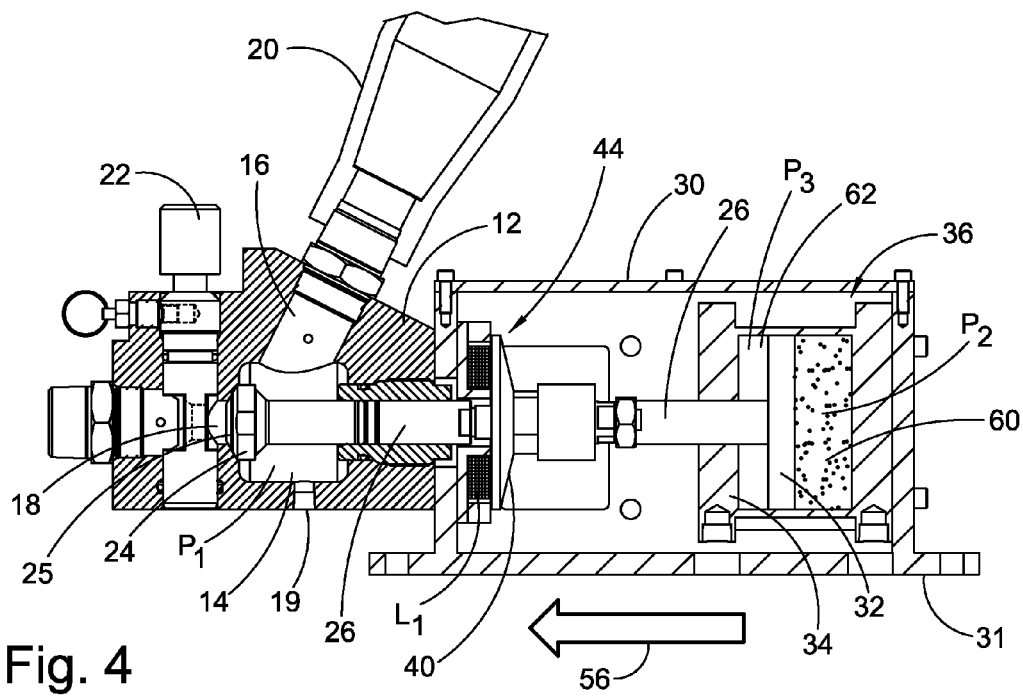
Figure 5:
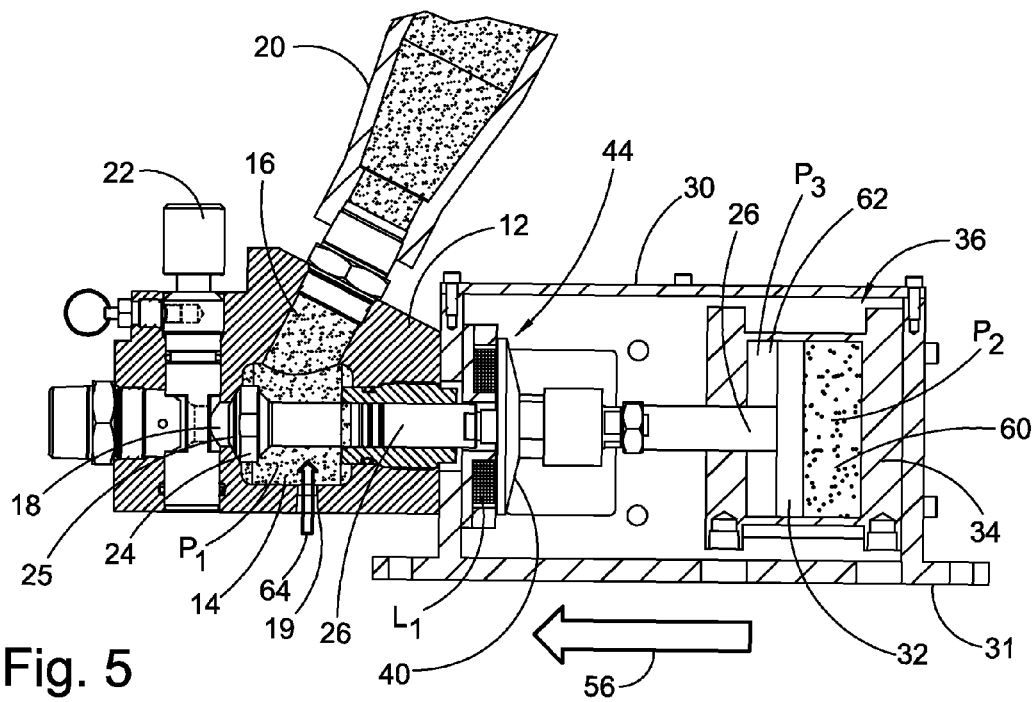

Valve 10 is shown in a closed position in FIG. 4. By closed position we mean that sealing member 24 engages outlet 18 for making reservoir 14 airtight. An activation of pneumatic actuator 36 forces rod 26 into the closed position shown. Specifically, the activation of pneumatic actuator 36 comprises pressurizing chamber 60 so that pressure $P_2$ is high enough to exert a force to move piston 32, and therefore rod 26 and sealing member 24, towards outlet 18. In a preferred embodiment, pressure $P_2$ is about 25 psig. As shown in FIG. 5, reservoir 14 is filled with a high pressure gas having pressure $P_1$ via charge port 19 as indicated by arrow 64. In the preferred embodiment, pressure $P_1$ is about 3,000 psig, but it could be other pressures, as desired. If auxiliary vessel 20 is present, the gas from charge port 19 will also fill the charge vessel, which is initially empty. Pressures $P_1$ and $P_2$ exert first and second forces on rod 26 (indirectly through piston 32 and sealing member 24, respectively) in the direction indicated by arrow 56 toward the outlet.

Figure 6:
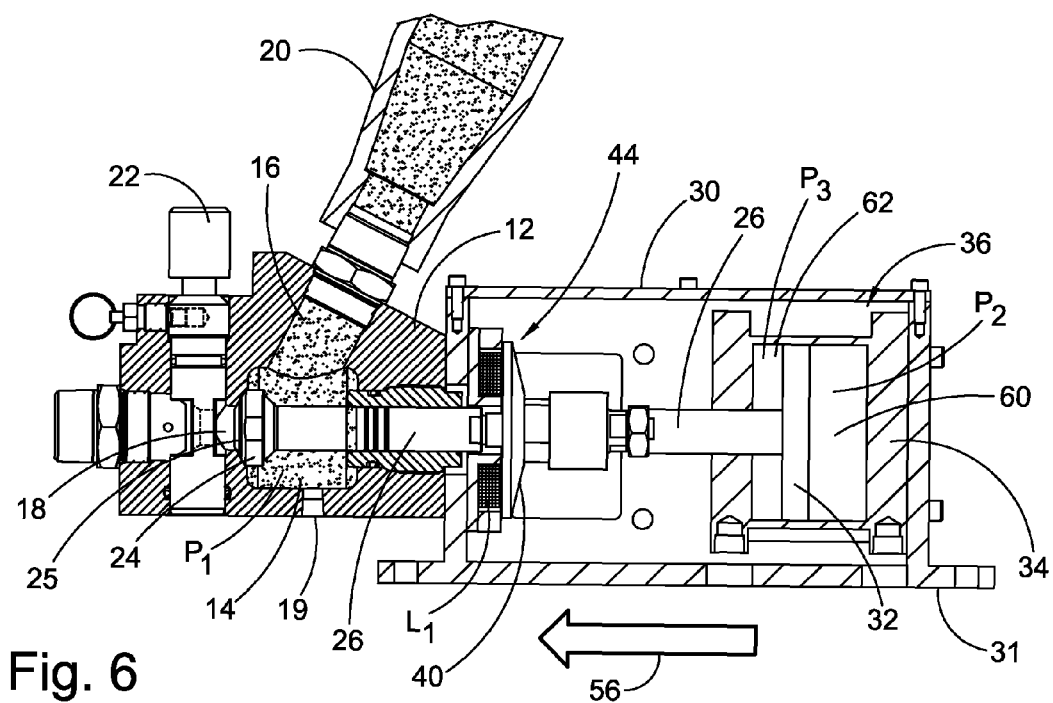

Next, chamber 60 is depressurized so that pressure $P_2$ returns to approximately atmospheric pressure, as shown in FIG. 6. However, rod 26 is held in sealed engagement with the outlet due to pressure $P_1$ exerting a force on sealing member 24 of the rod. In this Figure, the valve reservoir is storing the gas that is desired to be released when the outlet is opened, such as, for example, the gas necessary to fill an airbag in an airbag inflation test. It may be desirable to leave pressure $P_2$ at a relatively low value, such as 10 psig, so that it can cushion the cylinder from the piston when electro-magnetic actuator 44 is fired, as will be described later.

Figure 7:
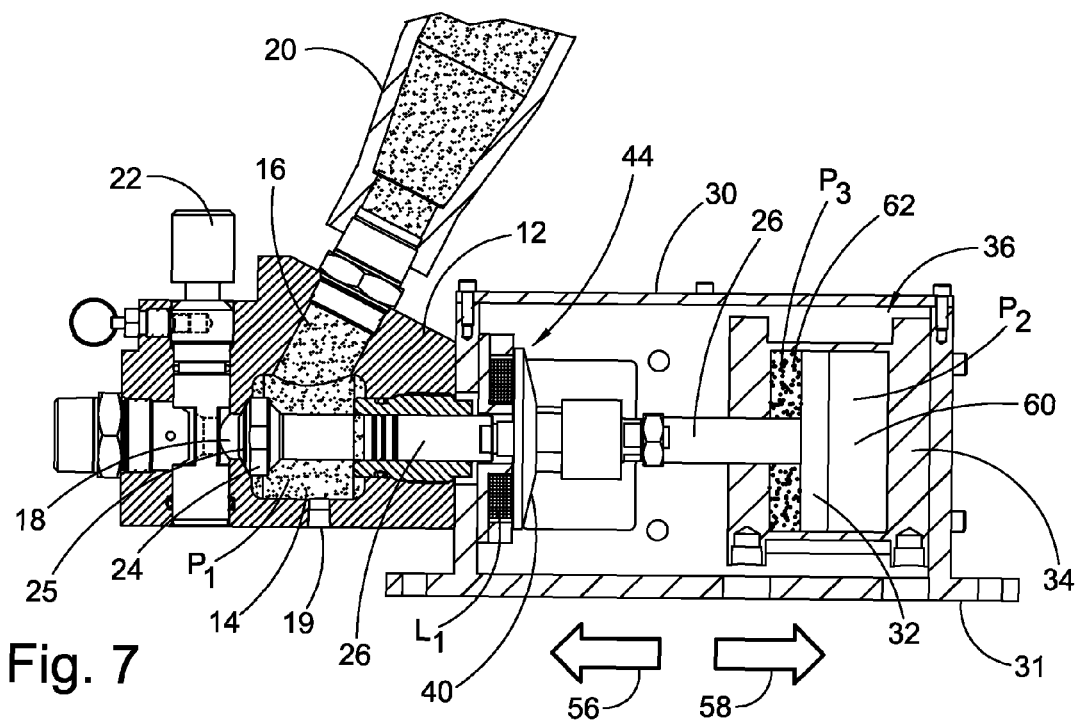

As shown in FIG. 7, chamber 62 is then pressurized so that it contains pressure $P_3$. Pressure $P_3$ exerts a third force in the direction of arrow 58 on piston 32, which transfers the third force to rod 26 and sealing member 24. Pressure $P_3$ is preferably increased to a point at which outlet 18 is just about to open, but at which the outlet is still completely sealed. That is, the magnitude of the force due to pressure $P_3$ in direction 58 is just less than a sum of the forces due to pressures $P_1$ and $P_2$ in direction 56. In the preferred embodiment, pressure $P_3$ varies between approximately 25-125 psig during this phase.

It is well known that the force exerted on a surface of a chamber is equal to the pressure in the chamber multiplied by the area of the surface. Therefore, by including a surface area of piston 32 on which pressure $P_3$ acts which is substantially greater than the surface area of sealing member 24 on which pressure $P_1$ acts, as shown in the Figures, it is possible to exert a force in direction 58 equal to a force in direction 56 with a substantially smaller pressure $P_3$ with respect to pressure $P_1$. Thus, in the preferred embodiment, when pressure $P_1$ is 3,000 psig, pressure $P_3$ only has to be about 125 psig to exert a force to sufficiently counteract the force exerted by pressure $P_1$.

If pressure $P_3$ were increased enough, so that the force in the direction of arrow 58 were higher than force due to pressure $P_1$ in the direction of arrow 56, the rod would be forced to move in direction 58, thereby opening outlet 18 by breaking the sealed engagement of the sealing member and the outlet. However, for many applications, particularly for testing the inflation of airbags, an entirely pneumatic valve would open the valve too slowly, and would also result in inconsistent opening times for the valve in repeated trials. Obviously, if valve 10 were used in a testing scenario, the valve must work consistently and quickly to properly simulate the same deployment speed as a real airbag.

Instead of increasing pressure $P_3$ further, pressure $P_3$ is held so that the forces exerted by pressure $P_3$ is just less than the sum of the forces exerted by pressures $P_1$ and $P_2$. That is, the outlet requires only a small amount of force to open, but the outlet is still completely sealed by the sealing member of the rod. For example, if the third force equaled ninety percent of the sum of the first and second forces, the electro-magnetic actuator would only have to overcome ten percent of the sum of the first and second forces to open the valve. As such, $P_3$ could be tuned with respect to pressures $P_1$ and $P_2$ for varying the opening speed of the valve.

Figure 8:
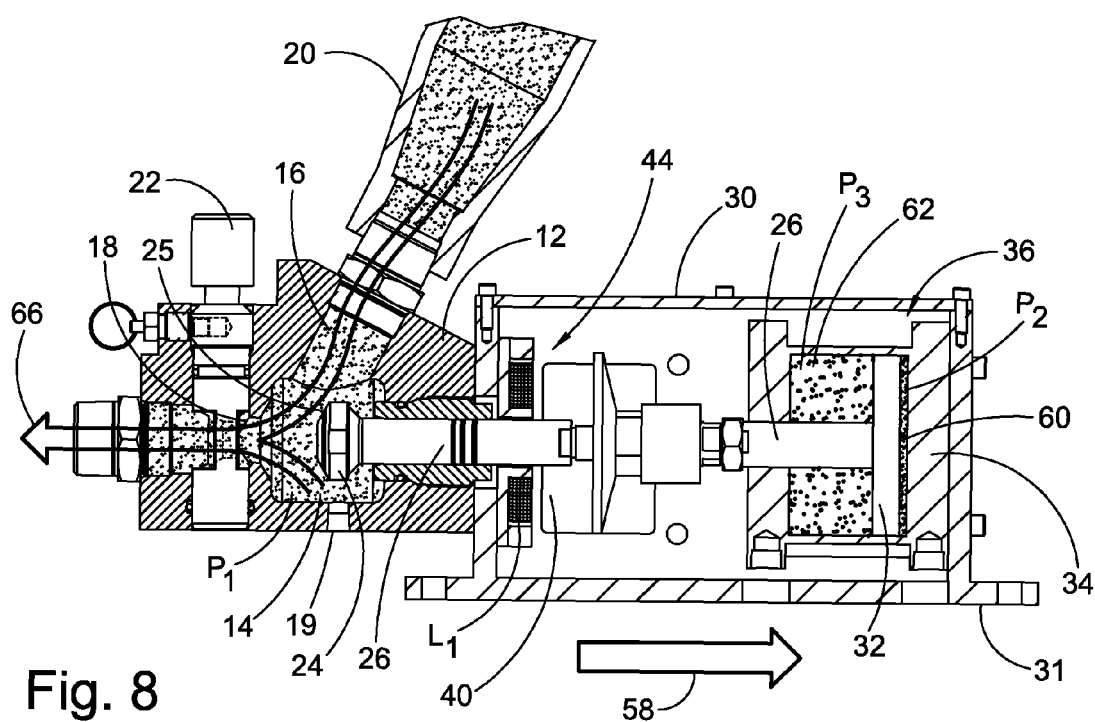

At the stage shown in FIG. 8, the pneumatic actuator has completed its activation and electro-magnetic actuator 44 is fired. Pressure $P_3$ counteracts the force due to pressure $P_1$, so that the electro-magnetic actuator has a substantially reduced force to overcome to open the outlet. That is, if pressure $P_3$ were not present, the electro-magnetic actuator would have to overcome a larger force in opening the outlet, which would result in a slower opening of valve 10. Moreover, by including an appropriate pressure $P_3$, one can quickly and consistently open valve 10 regardless of pressure $P_1$ of the gas stored in reservoir 14.

As discussed with respect to FIGS. 2a-2c, the activation of electro-magnetic actuator 44 creates powerful oppositely polarized magnetic fields which repel plate 40 from coil L. Since rod 26 is slidingly housed in housing 30 and plate 40 is fixedly secured to the rod, the repulsion of the plate from coil also moves the rod away from the outlet. If circuit 45 has the parameters described in the preferred embodiment above, the rod is repelled forcefully away from outlet 18, opening a one inch diameter outlet in about 2 ms. Advantageously, as soon as the outlet is cracked open, pressure $P_1$ surrounds and acts on the front of sealing member 24 to help open the outlet by pushing the rod in direction 58. Once the outlet is opened, the high pressure gas is released from reservoir 14 (and auxiliary vessel 20, if present) as indicated by arrow 66.

It should be appreciated that one could use valve 10 to do more than just inflate airbags for testing. For example, it has been conceived that one could use different nozzles on the end of valve 10 to produce and examine shockwaves or special gas flows, such as supersonic flows, in physiological or materials research. Additionally, one could choose to elongate rod 26 to extend out of the back of cylinder 34, for example, to use rod 26 as a ram, punch, plunger, impacting device, or launching means for a projectile, to name but a few possible applications.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A gas valve, comprising:
    a body including a reservoir for holding a gas, the reservoir including a charge port for filling the reservoir with the gas and an outlet for releasing the gas;
    an electro-magnetic actuator;
    a rod sealed with respect to the reservoir, passing through the electro-magnetic actuator, and including:
        a first end located within the reservoir and including a sealing ring located within the reservoir; and,
        a second end;
    a piston affixed to the second end; and,
    a pneumatic actuator including first and second chambers at least partially formed by the piston, wherein:
        the electro-magnetic actuator is located between the reservoir and the pneumatic actuator;
        the sealing ring is located between the outlet and the electromagnetic actuator;
        the pneumatic actuator is configured to displace the piston and rod in a first direction to seal the outlet with the sealing ring while the electromagnetic actuator is unactivated; and,
        the electromagnetic actuator is configured to displace the rod in a second direction, opposite the first direction, to unseal the sealing ring from the outlet.

2. The gas valve of claim 1, wherein:
    the reservoir includes a charge port, different from the charge port and the inlet, for accepting a gas into the reservoir; and,
    the charge port is aligned with the inlet in a direction orthogonal to a line from the first end of the rod to the second end of the rod.

3. The gas valve of claim 1, further comprising a plate fixedly secured to the rod and located between the electro-magnetic actuator and the piston, wherein the electromagnetic actuator includes only one single coil located between the plate and the reservoir.

4. The gas valve of claim 1, further comprising an orifice bar engaged with the body, wherein:
    the orifice bar includes an opening aligned with the outlet; and,
    a size of the hole is variable.

5. A high speed gas valve apparatus comprising:
a reservoir for holding a gas having a charge port for filling said reservoir with a gas and an outlet for releasing said gas from said reservoir;
a rod slidingly housed in said valve apparatus, said rod including a sealing means operatively arranged to engage said outlet of a valve chamber for sealing said reservoir when said valve apparatus is in a closed position;
a pneumatic actuator, wherein a piston of said pneumatic actuator is coupled to said rod; and,
an electro-magnetic actuator coupled to said rod; wherein:
   said gas is released from said reservoir via said outlet when said valve apparatus is in an open position;
   said valve transitions from said closed position to said open position by sequentially activating said pneumatic and electro-magnetic actuators to move said rod away from said outlet;
   said electro-magnetic actuator comprises:
      an electronic coil electrically coupled in a circuit to a high voltage power supply and a capacitor; and,
      an electrically conductive plate fixedly secured to said rod and located proximate said coil when said valve is in said closed position;
   said electro-magnetic actuator is activated by discharging a current from said capacitor through said coil for generating a first magnetic field in said coil;
   said first magnetic field induces eddy currents in said plate;
   said eddy currents generate a second magnetic field, and said second magnetic field is oppositely polarized with respect to said first magnetic field;
   a repulsion force is created due to said first and second magnetic fields being oppositely polarized; and
   said repulsion force repels said plate away from said coil for transitioning said valve from said closed position to said open position by moving said rod away from said outlet.

6. The gas valve apparatus recited in claim 5 wherein said valve apparatus further comprises:
a first chamber and a second chamber located on opposite sides of said piston in said pneumatic actuator;
wherein said gas in said reservoir has a first pressure that exerts a first force on said rod via said sealing means in a first direction for maintaining said valve in said closed position by forcing said sealing means of said rod to remain engaged with said outlet;
wherein a second pressure in said first chamber exerts a second force on said piston in said first direction for forcing said sealing means of said rod to engage with said outlet;
wherein a third pressure in said second chamber exerts a third force on said piston in a second direction, wherein said second direction is opposite from said first direction; and,
wherein subsequent to an activation of said pneumatic actuator, but preceding an activation of said electro-magnetic actuator, a sum of said first and second forces is greater than said third force.

7. The gas valve apparatus recited in claim 6 wherein said third force is slightly less than said sum of said first and second forces for substantially reducing a net force required by said electro-magnetic actuator to transition said valve from said closed position into said open position.

8. The gas valve apparatus recited in claim 5 wherein said plate is aluminum.

9. The gas valve apparatus recited in claim 5 wherein said coil is fabricated from ribbon wire.

10. The gas valve apparatus recited in claim 5 wherein said high voltage power source applies a voltage of approximately 2000V, said capacitor has a capacitance of approximately 150 µF, said coil has an inductance of approximately 2 mH and said circuit has a total resistance of approximately 1Ω.

11. The gas valve apparatus recited in claim 5 wherein said high voltage power source, said capacitor, and said coil comprise a critically damped RLC circuit.

12. The gas valve apparatus recited in claim 5 wherein said plate is pressed against said coil when said valve apparatus is in said closed position.

13. The gas valve apparatus recited in claim 12 wherein a thin layer of non-conductive material is sandwiched between said coil and said plate when said coil and said plate are pressed together.

* * * * *